(12) United States Patent
Cheng et al.

(10) Patent No.: US 10,419,894 B2
(45) Date of Patent: Sep. 17, 2019

(54) METHODS AND SYSTEMS FOR MAINTAINING A REQUIRED PARTICIPATION LEVEL FOR A PLURALITY OF COMMUNICATION DEVICES ASSIGNED TO A TASK GROUP

(71) Applicant: MOTOROLA SOLUTIONS, INC., Chicago, IL (US)

(72) Inventors: Qianyun Cheng, Sichuan (CN); Lanjian Cao, Sichuan (CN); Quanwen Du, Sichuan (CN); He Huang, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/064,702

(22) PCT Filed: Jan. 15, 2016

(86) PCT No.: PCT/CN2016/071067
§ 371 (c)(1),
(2) Date: Jun. 21, 2018

(87) PCT Pub. No.: WO2017/120898
PCT Pub. Date: Jul. 20, 2017

(65) Prior Publication Data
US 2019/0007802 A1    Jan. 3, 2019

(51) Int. Cl.
*H04W 4/08* (2009.01)
*G06Q 10/06* (2012.01)
(Continued)

(52) U.S. Cl.
CPC .............. *H04W 4/08* (2013.01); *G06Q 10/06* (2013.01); *H04W 4/10* (2013.01); *H04W 8/005* (2013.01); *H04W 76/50* (2018.02); *H04W 4/90* (2018.02)

(58) Field of Classification Search
CPC ........... H04W 4/08; H04W 4/10; H04W 4/90; H04W 8/005; H04W 76/45; H04W 76/50; G06Q 10/06
See application file for complete search history.

(56) References Cited

U.S. PATENT DOCUMENTS

| 7,454,579 B1 | 11/2008 | Ravan |
| 9,462,614 B2 | 10/2016 | Krizik et al. |

(Continued)

FOREIGN PATENT DOCUMENTS

| CN | 101866440 | 10/2010 |
| CN | 102663568 | 9/2012 |

(Continued)

OTHER PUBLICATIONS

PCT/CN2016/071067 International Search Report and Written Opinion of the International Searching Authority dated Sep. 28, 2016 (8 pages).

(Continued)

*Primary Examiner* — Raymond S Dean
(74) *Attorney, Agent, or Firm* — Michael Best & Friedrich LLP

(57) ABSTRACT

A method and apparatus for maintaining a participation level for a plurality of communication devices assigned to a task group. A server is communicatively coupled to the plurality of communication devices assigned to the task group and defines a minimum quantity of communication devices to be assigned an active executor role for the task group. Communication devices that are assigned the active executor role are locked to the active executor role for the task group when the quantity of communication devices that are currently assigned the active executor role does not exceed the minimum quantity of communication devices to be assigned the active executor role for the task group.

22 Claims, 8 Drawing Sheets

(51) Int. Cl.
*H04W 76/50* (2018.01)
*H04W 4/10* (2009.01)
*H04W 8/00* (2009.01)
*H04W 4/90* (2018.01)

(56) References Cited

U.S. PATENT DOCUMENTS

2010/0077460 A1  3/2010  Hare et al.
2015/0254786 A1  9/2015  Bank et al.
2017/0265045 A1  9/2017  Igumnov et al.

FOREIGN PATENT DOCUMENTS

CN  104599049   5/2015
CN  204650615   9/2015
JP  2008015608  1/2008

OTHER PUBLICATIONS

Motorola, "MOTOTRBO Job Tickets Configuration and Usage," SmartPTT Technical Support Cent website (2009-2015) 6 pages, http://support.smartptt.com/hc/en-us/articles/200241188-MOTOTRBO-Job-Tickets-configuration-and-usage.

METHODS AND SYSTEMS FOR MAINTAINING A REQUIRED PARTICIPATION LEVEL FOR A PLURALITY OF COMMUNICATION DEVICES ASSIGNED TO A TASK GROUP

BACKGROUND OF THE INVENTION

In various field service situations (such as, for example, police or medical personnel responding to an emergency call), mobile communication devices are linked to provide for communication and coordination of participants in a task. However, it a participant leaves the task and move on to another project, there may not be enough remaining participates to adequately address the situation.

Accordingly, there is a need for methods and systems for maintaining required participation levels using communication devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
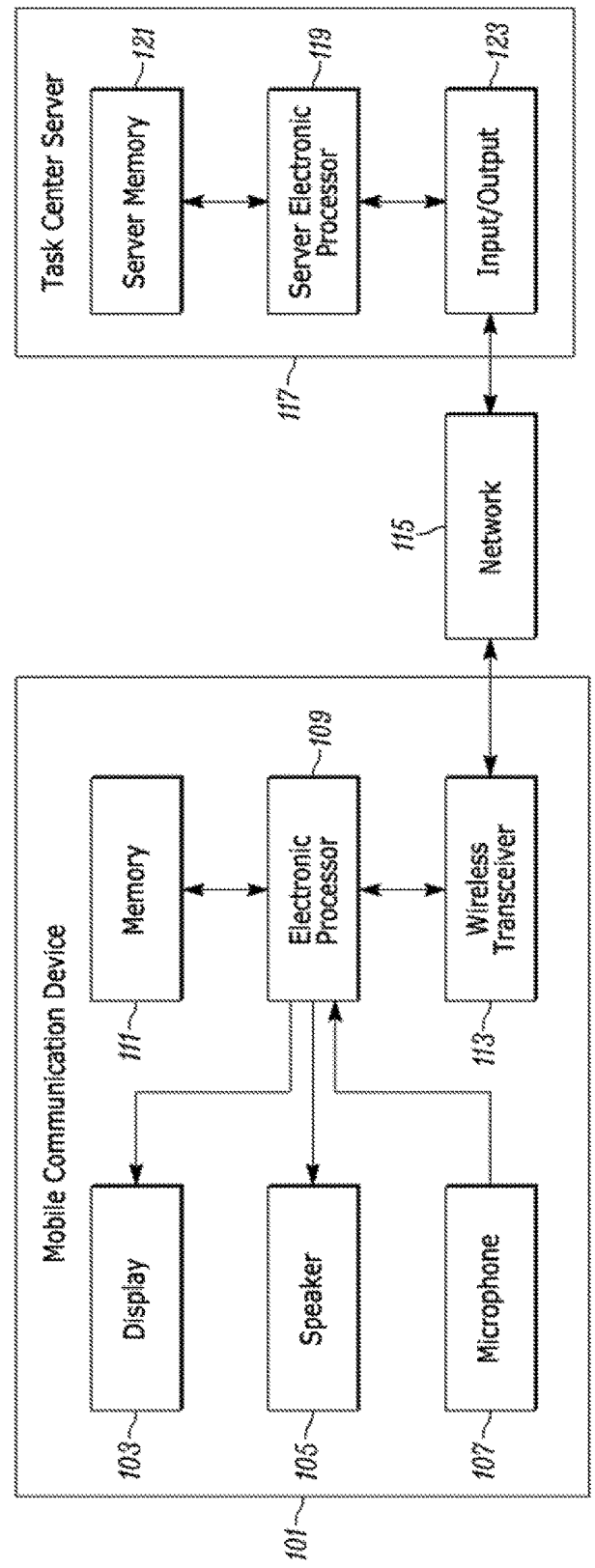
FIG. 1 is a block diagram of mobile communications network including a mobile communication device in communication with a task center server in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Methods and systems provided in this disclosure maintain a participation level for a plurality of communication devices assigned to a task group. A server is communicatively coupled to the plurality of communication devices assigned to the task group and defines a minimum quantity of communication devices to be assigned an active executor role for the task group. Communication devices that are assigned the active executor role are locked to the active executor role for the task group when the quantity of communication devices that are currently assigned the active executor role does not exceed the minimum quantity of mobile communication devices to be assigned the active executor role for the task group.

FIG. 1 is a block diagram of a mobile communications network. A mobile communication device 101—for example, a portable land mobile radio or a smart telephone—includes user interface hardware such as a display 103, a speaker 105, and a microphone 107. An electronic processor 109 receives input audio data from the microphone 107, provides output audio data to the speaker 105, and provides output visual data to the display 103. The electronic processor 109 is communicatively coupled to a memory 111 that stores data and instructions that are executable by the processor 109 to control the operation of the mobile communication device 101. The memory 111 includes one or more non-transitory computer-readable memory devices such as, for example, random access memory (RAM), read-only memory (ROM), Flash memory, or optical/magnetic disk storage.

The mobile communication device 101 also includes a wireless transceiver 113 capable of communicating wirelessly with other systems and devices. For example, the mobile communication device 101 is configured to connect to a network 115 and to communicate with a task center server 117 as described in further detail below. The task center server 117 also includes a server electronic processor 119, one or more non-transitory computer-readable server memories 121, and a server input/output interface 123 for communicatively connecting the task center server 117 to the network 115.

The mobile communications network illustrated in FIG. 1 is just one example. Other implementations may include other types of hardware or configurations. For example, the task center server can be implemented as a distinct piece of equipment (i.e., a remote server) as illustrated in FIG. 1 or can be decentralized within one or more mobile communication devices. As such, in some implementations, the mobile communications network may be implemented as an ad hoc network where the operation is controlled by one mobile device configured to provide the functionality of the "task center server" as discussed herein.

In some implementations, the mobile communication device 101 is a radio carried by a police officer or other emergency responder personnel and is used for in-the-field communication. When attending to a specific task or situations, the police officer (or other user) uses the radio to communicate with users of other mobile communication devices. In some implementations, the mobile communication device 101 is used to monitor and coordinate the actions performed by the users on a task by communicatively connecting specific devices into one or more "talk groups" and by displaying task information (e.g., instructions) on the display 103 of the device.

Figure 2:
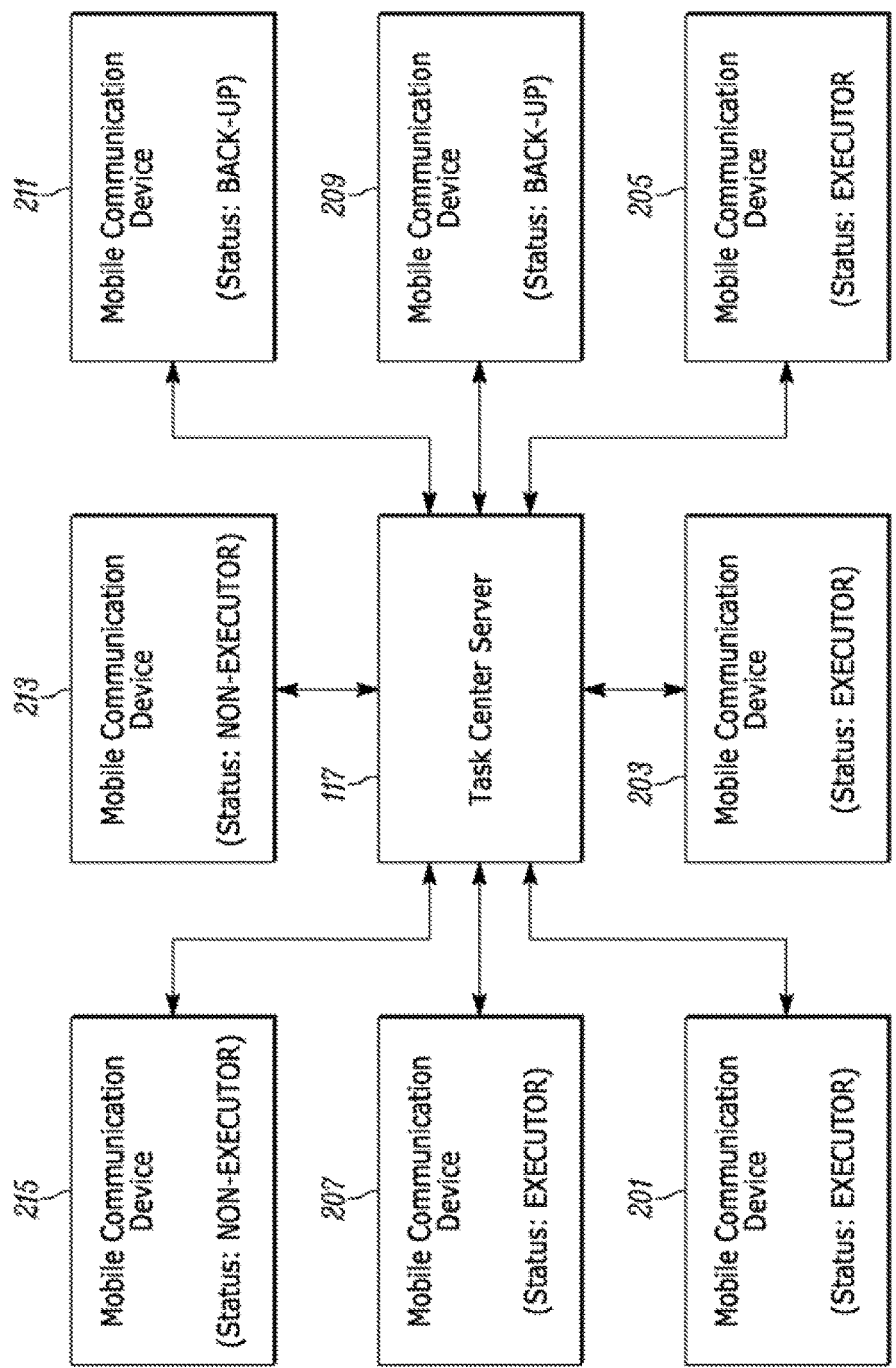
FIG. 2 is a block diagram of a plurality of mobile communication devices in communication with the task center server of FIG. 1 in accordance with some embodiments.

FIG. 2 is a block diagram illustrating one specific example of an incident area network. When an incident or task is initiated, multiple mobile communication devices (e.g., mobile communication device 201, mobile communication device 203, mobile communication device 205, mobile communication device 207, mobile communication device 209, mobile communication device 211, mobile communication device 213, and mobile communication device 215) are communicatively coupled to the task center server 117. Depending on the specific nature and requirements of the task, the task center server 117 establishes various roles including, for example, an "executor", a "back-up", and a "non-executor". In this example, an "executor" is a user that is actively participating in the task activity, a "back-up" is a user that is on stand-by and may be called on the actively participate in the task activity if necessary, and a "non-executor" is a user that is not actively participating in the task activity and may or may not be called to actively participate in the task activity. In the example of FIG. 2, all nine mobile communication devices are connected to the task center server 117 through the network. However, only four mobile communication devices are assigned a status of "executor." In some embodiments, only the mobile communication devices that are assigned the status of "executor" are added to a "talk group" for the task while, in other embodiments, the "back-up" and "non-executor" devices may also have access to the audio stream data of the talk group.

One example of a situation that may utilize the system illustrated in FIG. 2 is a group of police officers patrolling a street block. The "task" of patrolling requires a specific quantity of officers to patrol the area. If one of the officers needs to leave the task, he/she may attempt to disconnect his/her mobile communication device from the task/talk group and change the assigned status of the radio to "non-executor." However, to ensure that the required quantity of police officers continue to participate in the task, one of the mobile communication devices that is assigned a status of "back-up" or "non-executor" must be reassigned a status of "executor." As described in further detail below, in some implementations, the mobile communication device that is assigned a status of "executor" is locked and prevented from exiting the task or changing its status if doing so would cause the quantity of "executors" to fall below a minimum quantity defined for the specific task. Instead, the mobile communication device facilitates a process of finding a replacement to add as an "executor" on the task before disconnecting from the task/talk group.

The system of FIG. 2 could similarly be used in other situations and environments where a quantity of users are required to perform a task. For example, the networked mobile communication devices could be used in hotels, amusement parks, department stores, etc.

Figure 3:
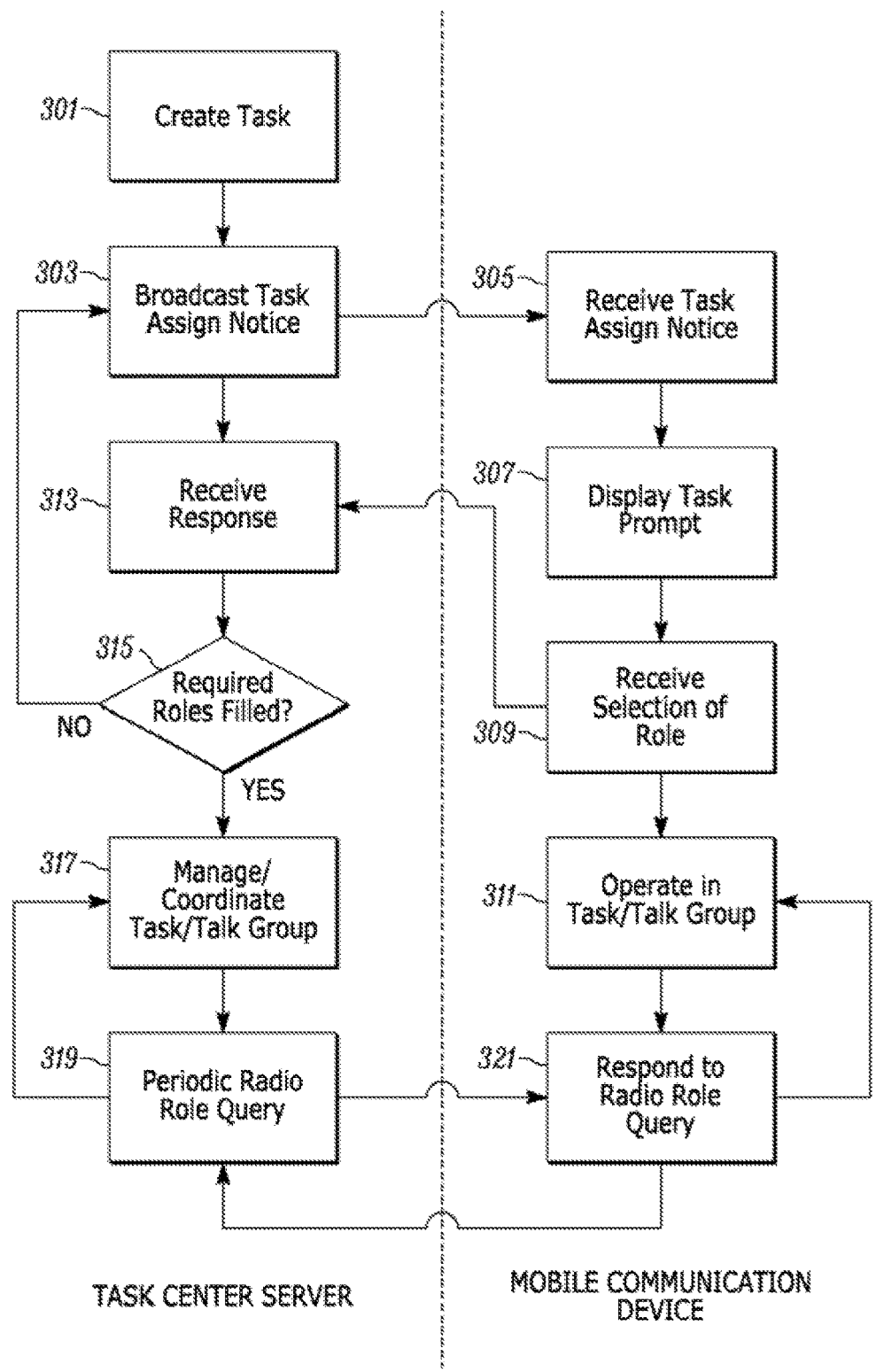
FIG. 3 is a flowchart of a method of creating a task and enrolling participant devices in a task group in accordance with some embodiments.

FIG. 3 illustrates a method of creating a new task and assigning "roles" for the task to a specific mobile communication device. A task is created at the task center server (block 301) either automatically or by a user initiating the task creation sequence. Various parameters for the task are defined including the time when the task starts and ends (e.g., can be daily, weekly, monthly, or of a defined/suggested duration from the time that the task is started), the specific radios that are assigned to the task (can be identified by a radio-specific identification (ID), a talk group ID, or a user specific ID that is then associated with a specific radio when the user logs in to the device), and minimum roles requirements for the task (e.g., a minimum quantity of executors, back-ups, and/or non-executors that must be maintained throughout the course of the task).

After the task information is established and the task is "created," the task center server communicates a "task assign notice" through the wireless network to the identified radios (block 303). When a mobile communication device receives the "task assign notice" (block 305), the display on the mobile communication device shows a prompt asking the user to select a role for the task (i.e., "executor," "back-up," or "non-executor") (block 307). After a role is selected (block 309), the mobile communication device operates as appropriate for the selected role (block 311). For example, if the "executor" role is selected, the mobile communication device is added to the active talk group for the task and receives visual display data associated with the task (in other examples, an active "executor" may only receive audio functionality). In some implementations, a user can attempt to change the role assigned to the mobile communication device at any time by accessing a menu option. However, as discussed below, the system may prevent the user from changing its role in some circumstances. Furthermore, in some implementations, a user can only elevate the assigned role (e.g., move from a "back-up" role or a "non-executor" role to an "executor" role if prompted to do so).

In this example, the task center server communicates the "task assign notice" only to a group of specific mobile communication devices. However, in some other implementations, the "task assign notice" is communicated generally to all mobile communication devices that are connected to the task center server through the network and a user of any connected device can decide whether to accept the task and select a role. Similarly, although this example allows a user of a mobile communication device to select their role (i.e., "executor," "back-up," or "non-executor"), in some implementations, the task assign notice further specifies a specific role that is to be assigned to each specific mobile communication device.

When a selection of a role is received by the mobile communication device (block 309), the mobile communication device sends a response message to the task center server identifying the role that has been selected for the mobile communication device for the task. After the response is received, the task center server determines whether the minimum role requirements for the task have been filled (block 315). If not, the task center server may send another communication of the task assign notice and, in some embodiments, may send the notice to additional mobile communication devices. However, if the task center server determines that all of the required roles are filled, the task center server proceeds to manage and coordinate the mobile communication devices based on their selected role for the task (block 317). In some embodiments, this may include sending text instructions, visual data, or audio cues to specific mobile communications devices or, for example, communicated to all mobile communication devices that are assigned the "executor" role for the task.

During operation of the task, the task center server will periodically communicate a "radio role query" (block 319). The query asks each mobile communication device associated with the task to respond and to confirm its current role.

Each individual mobile communication device sends a reply on a traffic channel to avoid heavy loading on a control channel (block 321) and then continues to operate according to its assigned role (block 311). The periodic "radio role query" enables the task center server to detect when one or more mobile communication devices are unintentionally disconnected from the task/talk-group (e.g., when a battery is depleted or when the mobile communication device moves out of range of the network).

As part of the radio role query (or, in some embodiments, as a separate periodic act), the task center server will communicate a task status notice indicating whether the minimum role requirements for the task are "not satisfied" (e.g., the quantity of "executor" mobile communication devices is below the defined minimum for the task), "just satisfied" (e.g., the quantity of "executors" is exactly equal to the defined minimum, or "well satisfied (e.g., the quantity of "executors" exceeds the defined minimum). In some implementations, the "radio role query" is sent over the traffic channel to reduce loading on the control channel. However, in some such implementations, the "task status notice" is sent over the control channel to ensure prompt and reliable receipt—particularly when the task status has changed. Furthermore, although some implementations are configured to communicate the "task status notice" periodically, in other implementations, the "task status notice" is communicated only when the status (i.e., the quantity of mobile communication devices assigned to each role) changes.

The task center server and each mobile communication device are programmed to ensure that the minimum role requirements for a task are maintained by selectively locking mobile communication devices that are currently assigned an "executor" role and preventing those mobile communication devices from leaving the task talk group or from changing its assigned role. Furthermore, the system are configured to prompt "back-up" and "non-executor" mobile communication devices to change their role to "executor" when the minimum role requirements are not satisfied and when an "executor" mobile communication device is attempting to change its status or leave the task.

Figure 4:
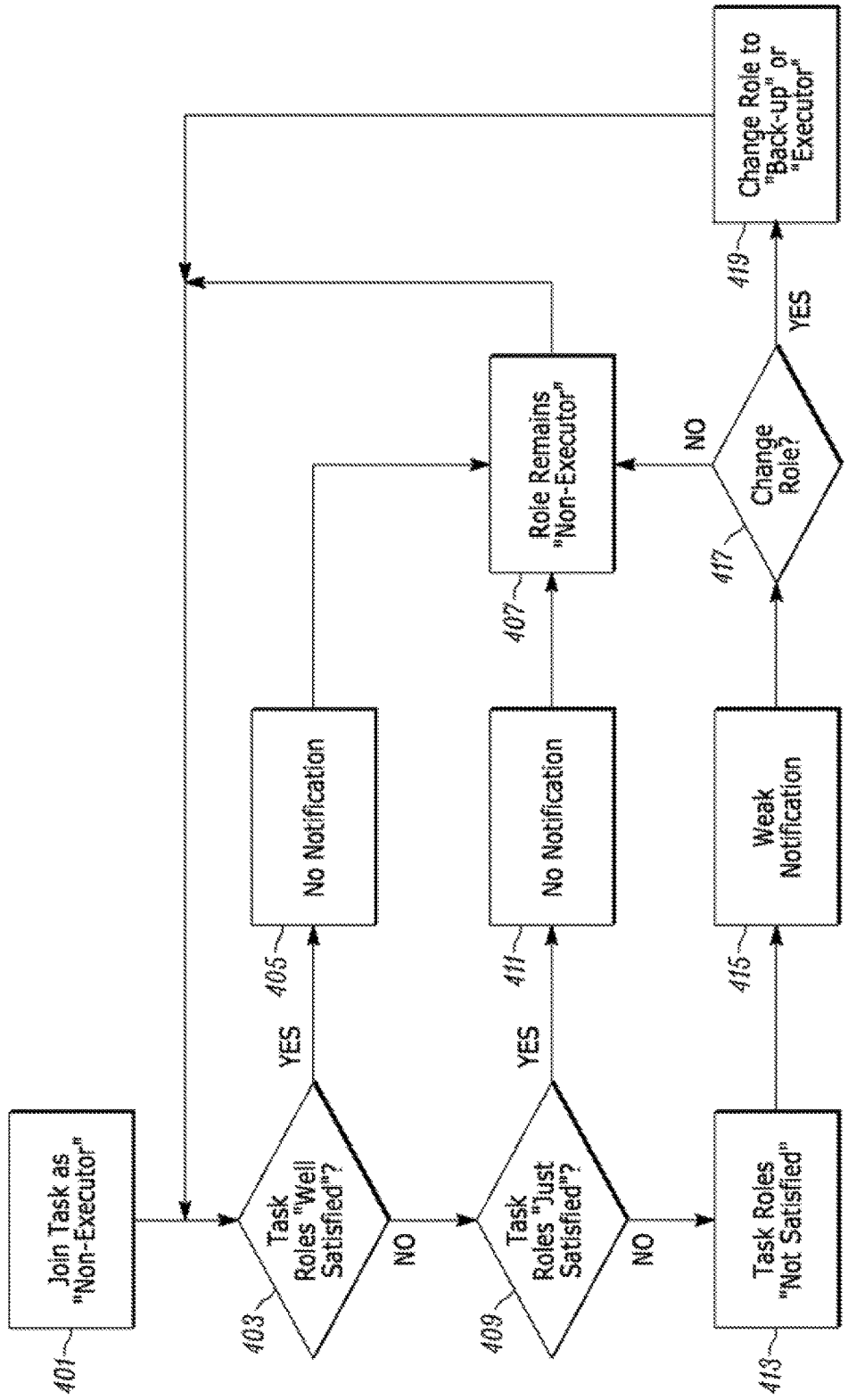
FIG. 4 is a flowchart of a method of operating a mobile communication device that is assigned a "non-executor" role in a task group in accordance with some embodiments.

FIG. 4 illustrates an example of a method for operating a mobile communication device that joins a task as a "non-executor" (block 401). Because the mobile communication device is a "non-executor," it is not actively connected to the talk-group for the task and generally receives few or no visual notifications or displays relating to the task. However, the mobile communication device may respond when a "task status notice" is communicated. For example, if the "task status notice, indicates that the task roles are "well satisfied" (i.e., the quantity of mobile communication devices that are assigned the role of "executor" exceeds the minimum quantity) (block 403), no notification is activated on the "non-executor" mobile communication device (block 405) and its assigned role remains the same (block 407). Similarly, when the "task status notice" indicates that the task roles are "just satisfied" (i.e., the quantity of "executors" equals the required quantity) (block 409), no notification is activated on the "non-executor" mobile communication device (block 411) and its assigned role remains the same (block 407).

However, when the "task status notice" indicates that the task roles are "not satisfied" (block 413), the mobile communication devices collectively work to add an additional "executor" to the task. The "non-executor" mobile communication device generates a "weak" notification (block 415). In response to the "weak" notification, the user of the "non-executor" mobile communication device may be prompted to change the role assigned to the mobile communication device (block 417). If the user declines, the role of the mobile communication device remains as "non-executor" (block 407). However, if the user agrees to change the role, the role assigned to the mobile communication device is changed to "back-up" or "executor" (block 419).

The notification generated by the mobile communication device may vary depending on the currently role of the mobile communication device and the urgency of the situation. For example, in FIG. 4, a "weak" notification is generated because the mobile communication device is assigned a "non-executor" role and, as such, is not primarily responsible for filling vacancies in the "executor" group. However, under the same circumstance, a "strong" notification would be generated on a mobile communication device that is assigned a "back-up" role.

Figure 5:
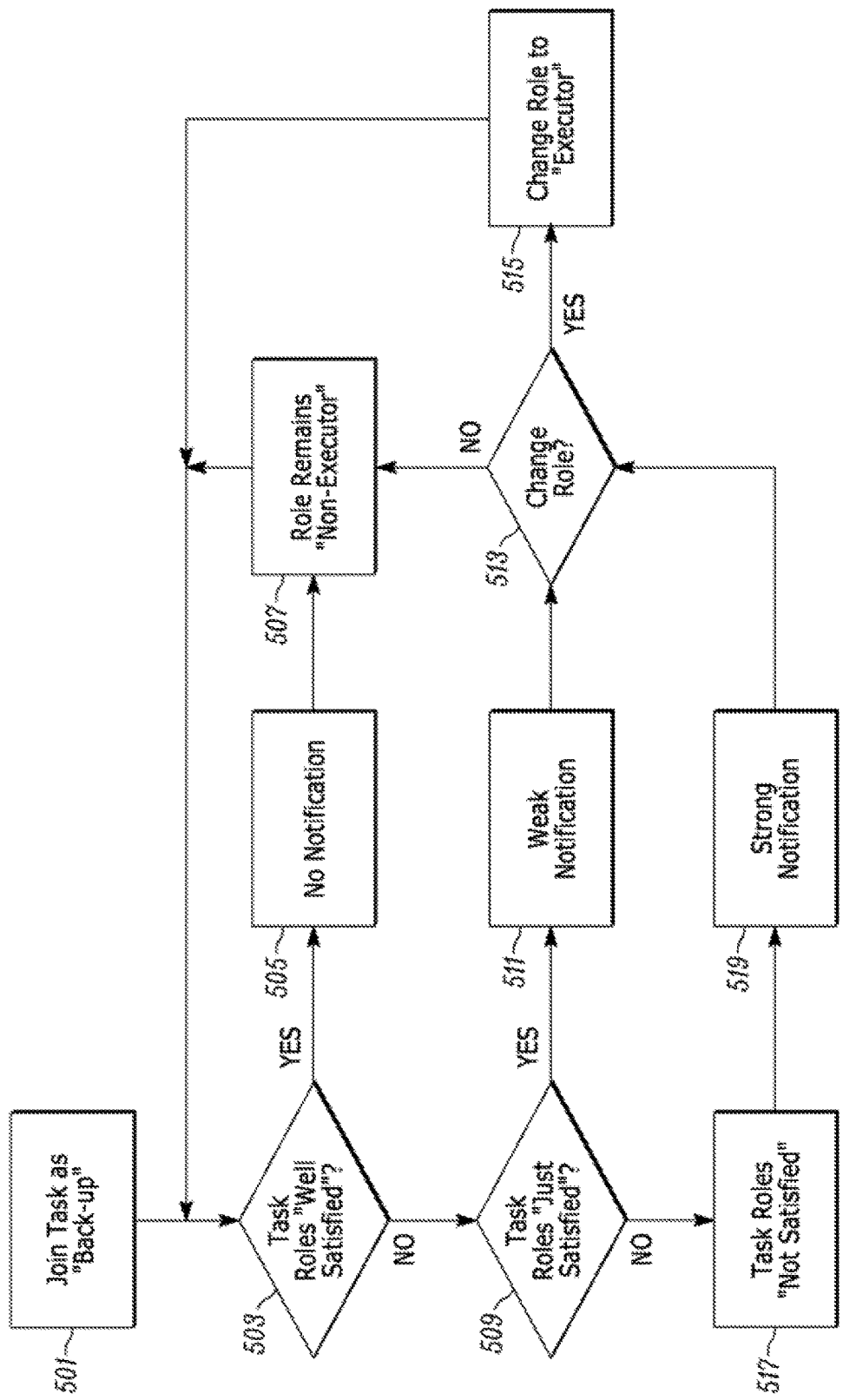
FIG. 5 is a flowchart of a method of operating a mobile communication device that is assigned a "back-up" role in a task group in accordance with some embodiments.

FIG. 5 illustrates a method of operating a mobile communication device that is assigned a "back-up" role for a task (block 501)—particularly in response to receiving a "task status notification." If the "task status notification" indicates that the task roles are well satisfied (i.e., more than enough "executors") (block 503), the mobile communication device generates no notification (block 505) and its role remains unchanged (block 507).

As described further below, if the task roles are "just satisfied," mobile communication devices that are assigned an "executor" status are locked to the task and are not able to leave the talk group. Therefore, if the "task status notification" indicates that the task roles are "just satisfied" (i.e., exactly enough "executors") (block 509), the mobile communication device generates a "weak" notification (block 511) and displays a prompt asking the user to change the role assigned to the mobile communication device (block 513). If the user accepts, the status assigned to the mobile communication device is changed to "executor" (block 515). However, it the user declines or does not reply to the prompt, the role assigned to the mobile communication device is unchanged (block 507).

Lastly, as noted above, a "back-up" role means that the user of the mobile communication device has a primary responsibility to become an "executor" if necessary to meet the role requirements for a task. Therefore, if the "task status notification" indicates that the task roles are "not satisfied" (block 517), the mobile communication device generates a strong notification (block 519). In this example, a prompt is still displayed by the mobile communication device (block 513) and the role assigned to the mobile communication device is not changed until/unless a user affirmatively responds to the prompt. However, in some other implementations, the role assigned to a "back-up" mobile communication device may be automatically changed to "executor" after the "strong" notification is generated (block 519).

As discussed above, the task center server and the mobile communication devices are configured to cooperatively maintain a minimum quantity of "executors" in a current task. Therefore, in some implementations, mobile communication devices that are assigned an "executor" role are locked and prevented from changing roles or leaving the task/talk group if doing so would cause the quantity of "executors" to fall below a defined minimum.

Figure 6:
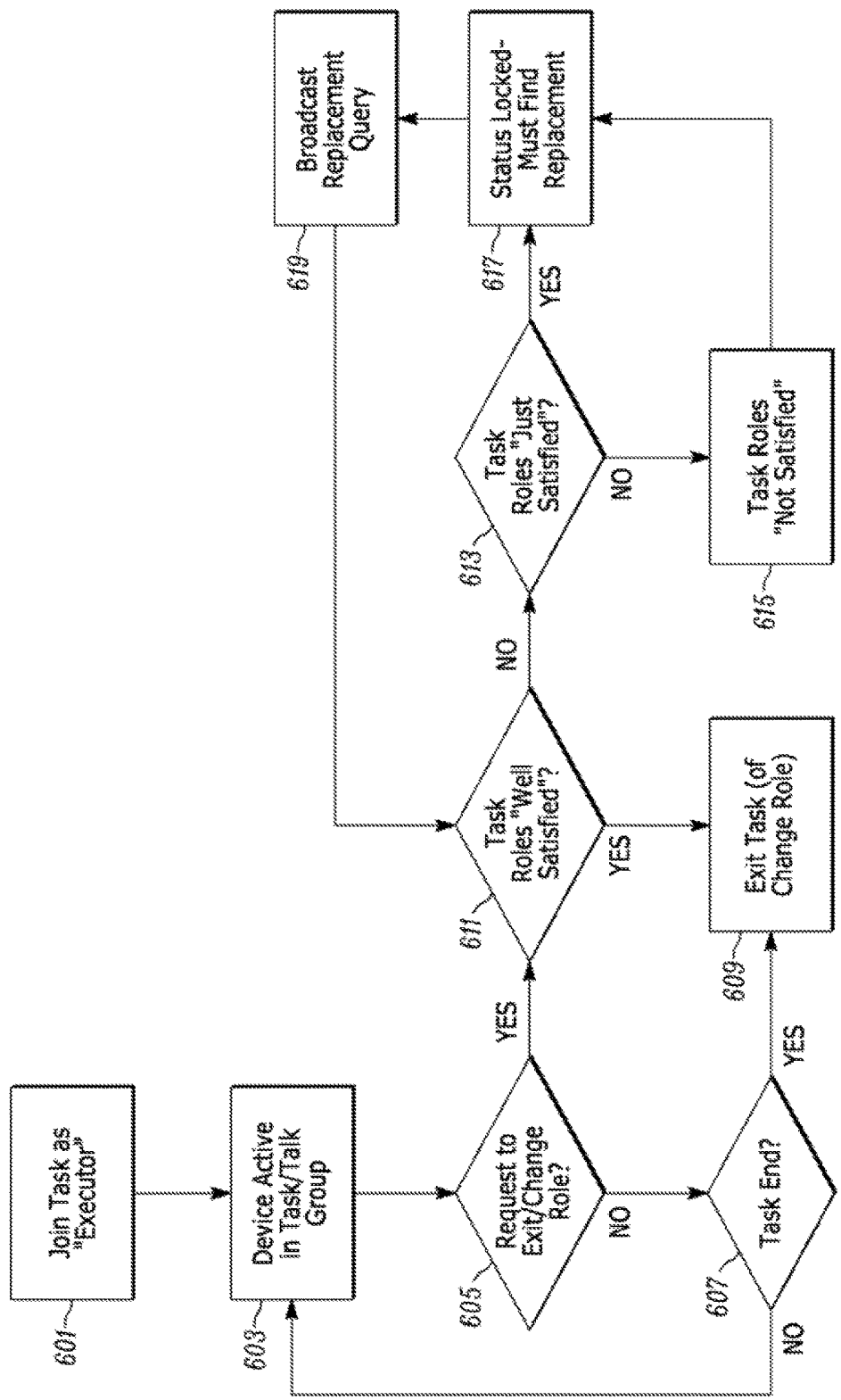
FIG. 6 is a flowchart of a method of operating a mobile communication device that is assigned an "executor" role in a task group in accordance with some embodiments.

FIG. 6 illustrates one example of how a mobile communication device is configured to operate to restrict an "executor" mobile communication device's ability to change a role or leave a task/talk-group. When a mobile communication device is assigned an "executor" role for a task (block 601), the mobile communication device is actively connected to the talk group for the task and may receive other visual and/or text-based instructions and alerts related to the task (block 603). This operation continues until the mobile communication device requests a change in role (or exits the task/talk group) (block 605) or the task ends (e.g., the defined duration of the task has expired) (block 607). If the task ends (block 607), then all mobile communication devices associated with the task exit the task/talk group (block 609).

If the mobile communication device attempts to exit the task or change the role assigned to the radio (e.g., in response to a command entered by a user through the user interface) (block 605), the mobile communication device either requests a "task status notification" or accesses the most recent "task status notification" stored to the memory of the mobile communication device. If the task roles are "well satisfied" (i.e., more than enough "executors") (block 611), then the mobile communication device is able to change its role or, in some implementations, to exit the task entirely (block 609). However, if the "task status notification" indicates that the task roles are "just satisfied" (block 613) or "not satisfied" (block 615), then the status of the mobile communication device is locked to "executor" (block 617) and a replacement must be found before the status can be unlocked. In some implementations, a mobile communication device that has its status "locked" as "executor" does not provide the user an option to change the assigned role for the task or to join a different talk group. In other implementations, a "locked" status further restricts the operation of the mobile communication device and may prevents the mobile communication device from being powered down or from accessing certain functionalities of the mobile communication device.

In some implementations, the mobile communication device is configured to communicate a replacement query message (block 619). The replacement query message in some implementations instructs all mobile communication devices associated with the task that are currently assigned the "back-up role" to generate a strong notification and to ask their user to change the assigned role for the mobile communication device to "executor." In other implementations, the "replacement query" simply instructs the task center server to communicate a new "task status notification," which, as discussed above in reference to FIG. 4, causes the "back-up" mobile communication devices to generate a "weak" notification.

In still other implementations, the mobile communication device is configured to display a list of mobile communication devices that are currently assigned a "back-up role" (and/or a list of user profiles associated with those mobile communication devices). The user of the mobile communication device that is attempting to change its "executor" role is then able to select a specific mobile communication device (or user profile) from the displayed list and the replacement query is sent directly to the selected mobile communication device.

The "executor" mobile communication device is only able to change its role or exit the task/talk group once an additional "executor" is added to the task and, as a result, the task roles are "well satisfied" (i.e., at least one more "executor" then required) (block 611). Furthermore, in some implementations, the mobile communication device that initiates the "replacement query" is tracked such that, when an additional "executor" is added, only the specific mobile communication device that initiated the "replacement query" is unlocked and able to change its role. In this way, the ability to leave the "executor" status is reserved for a specific mobile communication device and another mobile communication cannot supersede and leave the "executor" group instead. Similarly, in some other implementations, when the task roles are "just satisfied" or "not satisfied," the task center server maintains a queue of mobile communications devices that are attempting to change their "executor" status and those mobile communication devices are "unlocked" as new "executors" are added in the order in which they requested the status change.

As discussed above, a mobile communication device can be configured to generate a "weak" notification or a "strong" notification in response to various specific situations. In various different implementations, "strong" notification and a "weak" notification can be differentiated based on a generated tone or sound, a vibration of the mobile communication device, or a visual output. For example, a strong notification may include a continue tone that is stopped only after the user presses a button (or touches a touchscreen) while a weak notification may include only a momentary tone that stops automatically after a defined period of time. Similarly, a strong notification may include a continuous vibration of the mobile communication device that again is stopped only after the user presses a button while a weak notification includes only a momentary vibration that stops automatically after a period of time.

Figure 7A:
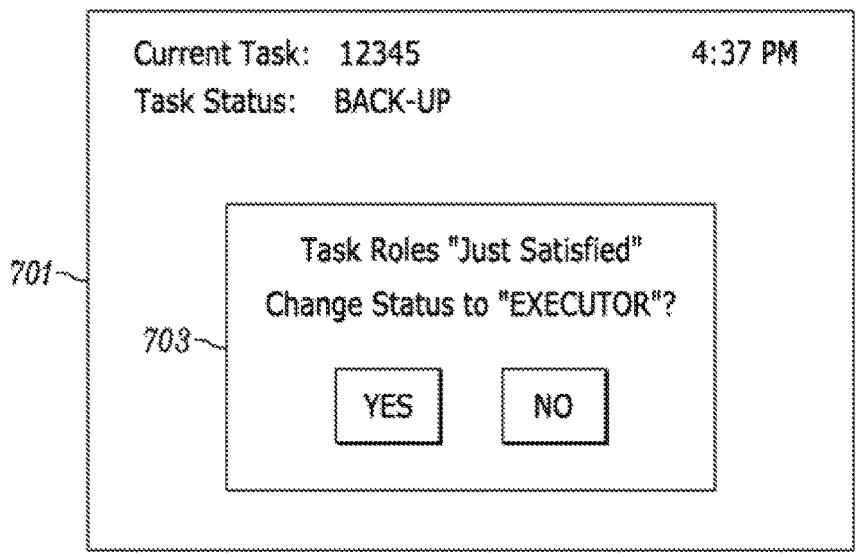
FIG. 7A is a graphical user interface displaying a weak-level notification on a mobile communication device that is assigned a "back-up" role in a task group in accordance with some embodiments.
Figure 7B:
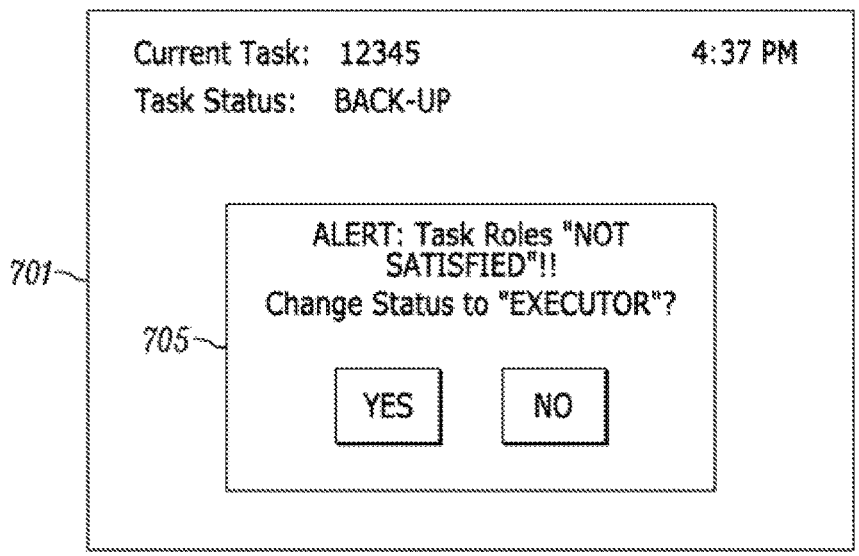
FIG. 7B is a graphical user interface displaying a strong-level notification on a mobile communication device that is assigned a "back-up" role in a task group in accordance with some embodiments.

FIGS. 7A and 7B illustrate an example of visual mechanisms that differentiate between a "strong" notification and a "weak" notification. FIG. 7A illustrates an example graphical user interface shown on the display 701 of a mobile communication device. The graphical user interface provides information including a current time, a current task, and the role assigned to the mobile communication device for the current task. The graphical user interface also shows a "pop-up" window 703 that provides a "weak" notification. The "weak" notification window 703 indicates that the role status is "just satisfied" and asks the user if they would like to change the status assigned to the mobile communication device to "executor."

FIG. 7B illustrates an example graphical user interface shown on the same display 701—this time providing a "strong" notification in the form of a pop-up window 705. The "strong" notification window 705 indicates that the role status is "not satisfied" and again prompts the user to change the status assigned to the mobile communication device to "executor."

In addition to displaying different text, the "weak" notification and "strong" notification can be further differentiated by other visual cues including different display colors; a flashing message window, text, or LED indicator; or the size of the window.

Figure 8:
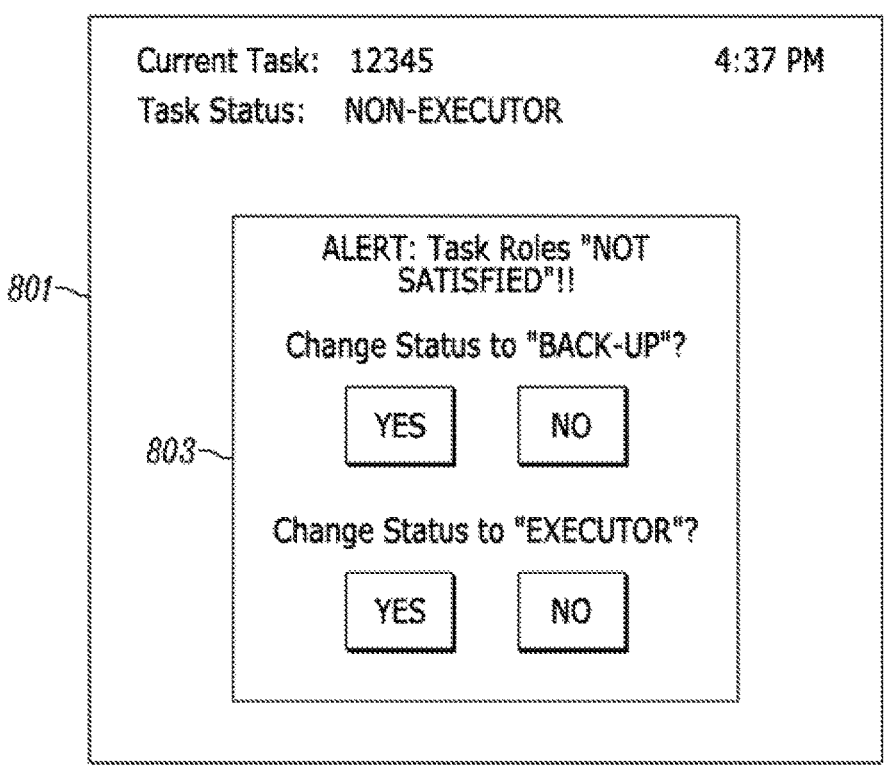
FIG. 8 is a graphical user interface displaying a weak-level notification on a mobile communication device that is assigned a "non-executor" role in a task group in accordance with some embodiments.

As discussed above, a "weak" notification is also generated on a mobile communication device that is assigned a "non-executor" status in the event that the task role status falls to "not satisfied." FIG. 8 provides an example of a graphical user interface shown on a display 801 of a "non-executor" mobile communication device. The display provides the "weak" notification as a pop-up window that indicates the current task role status and prompts the user to change the status of the mobile communication device to either "executor" or "back-up."

Finally, the specific types and mechanisms for presenting the various levels of notifications described above are only some examples. Other types and mechanisms of generating the notifications may be used. For example, in some implementations, the strong and/or weak notifications may include any one of a visual alert, a text alert, an audio alert, a haptic alert, or combinations thereof.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of maintain a required participation level for a plurality of communication devices assigned to a task group, the method comprising:
    defining, by a server communicatively coupled to the plurality of communication devices, a minimum quantity of communication devices to be assigned an active executor role for the task group; and
    locking a communication device to the active executor role for the task group when the quantity of communication devices that are currently assigned the active executor role does not exceed the minimum quantity of communication devices to be assigned the active executor role for the task group.

2. The method of claim 1, further comprising receiving, by the server from the communication device currently assigned the active executor role for the task group, a request to relinquish the active executor role, and
    wherein locking the communication device to the active executor role includes preventing the communication device from relinquishing the active executor role.

3. The method of claim 2, further comprising approving, by the server, the request from the communication device to relinquish the active executor role when the quantity of communication devices currently assigned the active executor role for the task group exceeds the minimum quantity of communication devices to be assigned the active executor role for the task group.

4. The method of claim 3, wherein, in response to approving the request for the communication device to relinquish the active executor role, the communication device remains assigned to the task group and is assigned a non-executor role for the task group.

5. The method of claim 3, wherein, in response to approving the request for the communication device to relinquish the active executor role, the communication device is assigned to a different task group.

6. The method of claim 1, wherein locking the communication device to the active executor role includes preventing the communication device from powering down or joining a different task group.

7. The method of claim 6, wherein preventing the communication device from powering down or joining a different task group includes modifying a graphical user interface displayed on the communication device to temporarily omit one or more functional options from the graphical user interface.

8. The method of claim 1, further comprising:
transmitting, by the server to the plurality of communication devices assigned to the task group, a radio role query requesting each communication device of the plurality of communication devices respond by identifying its assigned role for the task group;
receiving, by the server from one or more communication devices of the plurality of communication devices assigned to the task group, a response to the radio role query; and
determining, by the server based on the responses to the radio role query, the quantity of communication devices that are currently assigned the active executor role for the task group.

9. The method of claim 1, further comprising transmitting, by the server to the plurality of communication devices assigned to the task group, a task status notice indicating whether the quantity of communication devices that are currently assigned the active executor role for the task group exceeds the minimum quantity.

10. The method of claim 9, wherein each mobile communication device of the plurality of communication devices assigned to the task group is assigned a status selected from a group consisting of an active executor role, a back-up executor role, and a non-executor role, and further comprising:
generating a weak notification on a communication device assigned a back-up executor role in response to receiving a task status notice indicating that the quantity of communication devices that are currently assigned the active executor role for the task group is equal to the minimum quantity; and
generating a strong notification on the communication device assigned a back-up executor role in response to receiving a task status notice indicating that the quantity of communication devices that are currently assigned the active executor role for the task group is less than the minimum quantity.

11. The method of claim 10, further comprising:
generating no notification on a communication device assigned a non-executor role in response to receiving a task status notice indicating that the quantity of communication devices that are currently assigned the active executor role for the task group is equal to the minimum quantity; and
generating the weak notification on the communication device assigned a non-executor role in response to receiving a task status notice indicating that the quantity of communication devices that are currently assigned the active executor role for the task group is less than the minimum quantity.

12. The method of claim 10, wherein the weak notification includes at least one selected from a group consisting of an audible tone, a vibration, and a visual indicator.

13. The method of claim 10, wherein generating the strong notification on the communication device includes displaying a prompt asking a user to approve a change in the status assigned to the communication device from the back-up executor role to the active executor role.

14. The method of claim 1, further comprising transmitting, by the server, a replacement query message in response to receiving, from a communication device locked to the active executor role, a request to relinquish the active executor role.

15. A system for maintaining a required participation level for a plurality of communication devices assigned to a task group, the system comprising:
the plurality of communication devices assigned to the task group, each communication device of the plurality of communication devices including a memory storing an indication of a status assigned to the mobile communication device for the task group, the status being selected from a group consisting of an active executor role, a back-up executor role, and a non-executor role; and
a server communicatively coupled to each communication device of the plurality of communication devices and configured to
define a minimum quantity of mobile communication devices to be assigned an active executor role for the task group, and
locking a communication device to the active executor role for the task group when the quantity of communication devices that are currently assigned the active executor role does not exceed the minimum quantity.

16. The system of claim 15, wherein each communication device of the plurality of communication devices is further configured to prevent the communication device from relinquishing the active executor role when the communication device is locked to the active executor role.

17. The system of claim 15, wherein each communication device of the plurality of communication devices is further configured to prevent the communication device from powering down or joining a different task group when the communication device is locked to the active executor role.

18. The system of claim 15, wherein each communication device of the plurality of communication devices includes a display and is further configured to
display a graphical user interface on the display, and
modify the graphical user interface to omit one or more functional items from the graphical user interface when the communication device is locked to an active executor role.

19. The system of claim 15, wherein the server is further configured to transmit a task status notice indicating whether the quantity of communication devices that are currently assigned the active executor role for the task group exceeds the minimum quantity.

20. The system of claim 19, wherein each communication device of the plurality of communication devices assigned to the task group including a user interface and is further configured to:
selectively generate a weak notification and a strong notification on the user interface in response to receiving the task status notice, wherein a selection of the weak notification or the strong notification is based on the status assigned to the communication device for the task group and whether the task status notice indicates that the quantity of communication devices assigned an active executor role for the task group is less than the minimum quantity.

21. The system of claim 20, wherein the user interface includes a display, and wherein the each communication device of the plurality of communication devices is configured to display the strong notification by displaying a prompt on the display asking as user to approve a change in the status assigned to the communication device to the active executor role.

22. The system of claim 15, wherein the server is further configured to
- receive a request for relinquish the active executor role from a communication device that is locked to the active executor role, and
- transmit a replacement query message to the plurality of communication devices in the assigned task group in response to receiving the request.

\* \* \* \* \*